United States Patent
Kaji (10) Patent No.: US 6,801,839 B2
(45) Date of Patent: Oct. 5, 2004

(54) CONTROL PARAMETER SELECTING APPARATUS FOR BOAT AND SAILING CONTROL SYSTEM EQUIPPED WITH THIS APPARATUS

(75) Inventor: Hirotaka Kaji, Hamamatsu (JP)

(73) Assignee: Yamaha Hatsudoki Kabushiki Kaisha (JP)

( * ) Notice: Subject to any disclaimer, the term of this patent is extended or adjusted under 35 U.S.C. 154(b) by 0 days.

(21) Appl. No.: 10/444,619

(22) Filed: May 23, 2003

(65) Prior Publication Data

US 2003/0220724 A1 Nov. 27, 2003

(30) Foreign Application Priority Data

May 24, 2002 (JP) ...................................... 2002-150991

(51) Int. Cl.[7] .............................................. G60L 15/00
(52) U.S. Cl. ........................... 701/21; 701/36; 701/201
(58) Field of Search ............................... 701/21–36, 41, 701/70, 99, 200, 207, 209, 210, 213, 300, 301, 201

(56) References Cited

U.S. PATENT DOCUMENTS 5,152,239 A * 10/1992 Hossfield ................ 114/144 E
5,983,159 A * 11/1999 Schipper ..................... 701/213
6,273,771 B1 * 8/2001 Buckley et al. ................ 440/84
6,308,649 B1 * 10/2001 Gedeon .................... 114/39.11

* cited by examiner

Primary Examiner—Richard M. Camby
(74) Attorney, Agent, or Firm—Young & Basile, P.C.

(57) ABSTRACT

A control parameter selecting apparatus and a sailing control system capable of selecting a control parameter for performing a suitable sailing control of a boat correspondingly to a sailing condition are provided. A sailing control system 1 is constructed by including a control parameter selecting apparatus 10, a sailing control device 11, a display device 12, and a propeller 13, and the control parameter selecting apparatus 10 is constructed by including a positional information detecting device 101, a water area information storing device 102 in which information of a designated water area is stored, a designated water area determining part 103 for determining whether a boat is located in a designated water area or not, a cruising distance calculating device 104 for calculating a distance the boat is capable of cruising, a cruising distance determining part 105 for determining whether cruising to a destination is possible or not, a control parameter selecting part 106 for selecting a control parameter for calculating a suitable control amount in the sailing control device 11 based on the aforesaid determination result, and a control parameter storing device 107 in which a plurality of kinds of control parameters are stored.

16 Claims, 7 Drawing Sheets

CONTROL PARAMETER SELECTING APPARATUS FOR BOAT AND SAILING CONTROL SYSTEM EQUIPPED WITH THIS APPARATUS

BACKGROUND OF THE INVENTION

1. Field of the Invention

The present invention relates to a sailing control in a boat, and particularly relates to a control parameter selecting apparatus preferable for selecting a suitable control parameter corresponding to a sailing condition of a boat and inputting it into a sailing control device, and a sailing control system utilizing this apparatus.

2. Description of the Related Art

With the recent development of information technology, boat's LAN technology is implemented for connecting a hull and an outboard motor, and various kinds of measuring instruments with a LAN and displaying a condition of the outboard motor on each of the measuring instrument mounted on a steering seat of the hull. Use of this makes it possible to connect a plurality of input and output devices including a GPS to a LAN and to display a plurality of hull information signals on a display device mounted on the steering seat. It also makes it easier to control a plurality of actuators mounted on the hull by using a plurality of hull information signals. Accordingly, new-generation boats become available with various proposed sailing controls being integrated therein.

The GPS and DGPS also become widely used in small boats. From these systems, information on speed and position (latitude, longitude, altitude) is generally obtained. "Navigation system-coordinated shift control system" for automobiles, which utilizes such positional information to perform optimal transmission control conforming to geographic features by utilizing the positional information, is made available for practical use.

However, as for boats, there is the problem that a user has to determine and select a suitable hull control according to the positional information of the boat at the time, a tidal current condition, a weather condition and the like. It is especially necessary to make fine settings according to the sailing places in order to achieve smooth marine traffic, which is likely to be a large burden on the user.

Since a control corresponding to the positional information as in the above-described "Navigation system-coordinated shift control system" is not performed in a boat equipped with the GPS, the user has to control the steering and speed manually, for example, when sailing in the water areas where rocks emerge from under the water depending on rise and fall of the tide.

The present invention is made in view of the above-described unsolved problem of the prior arts, and its object is to provide a control parameter selection apparatus capable of selecting the control parameter for performing a suitable sailing control of a boat corresponding to a sailing condition and a sailing control system equipped with this apparatus.

SUMMARY OF THE INVENTION

In order to attain the above-described object, a control parameter selecting apparatus for a boat as set forth in claim 1 according to the present invention is, in a boat comprising a propeller and a sailing control device which performs a predetermined sailing control based on a control parameter, characterized by comprising parameter storing means for storing a plurality of kinds of the aforesaid control parameters corresponding to various sailing conditions, sailing information detecting means for detecting information regarding the sailing condition of the aforesaid boat, positional information detecting means for detecting positional information of the boat, and parameter selecting means for selecting a suitable control parameter for the sailing condition at the time from the aforesaid plurality of kinds of control parameters based on the information regarding the aforesaid sailing condition detected by the aforesaid sailing information detecting means and the positional information of the aforesaid boat detected by the aforesaid positional information detecting means, and inputting it into the aforesaid sailing control device.

With this construction, it is possible to detect the information regarding the present sailing condition of the boat by the sailing information detecting means, it is possible to detect the present positional information of the boat by the positional information detecting means, and it is possible to select the suitable control parameter for the sailing condition of the boat at the time from a plurality of kinds of control parameters based on the information regarding the present sailing condition detected by the sailing information detecting means and the positional information detected by the positional information detecting means and input it into the sailing control device.

Accordingly, it is possible to select the suitable parameter as the control parameter inputted into the sailing control device correspondingly to the sailing condition of the boat and switch to the suitable parameter, and it becomes possible to perform a sailing control according to the selected control parameter, therefore making it possible to reduce a burden on the user in steering the boat.

Here, the information regarding the sailing condition means speed information of the boat, which changes according to the weather, tide and the like, the attitude information of the boat and the like, and the information may include anything other than this, if only it is the information regarding the sailing condition of the boat.

The control parameter is used for calculating a control amount corresponding to the sailing condition in the sailing control device, and if the sailing control device is equipped with an electronic throttle valve control device, a power steering control device and a power trim control device, it serves as the parameter for calculating the electronic throttle valve opening, the steering angle and the trim angle, respectively.

The invention according to claim 2 is in the control parameter selecting apparatus for the boat as set forth in claim 1, characterized by further comprising water area information storing means for storing information of a designated water area, and designated water area determining means for determining whether the aforesaid boat is located in the designated water area or not based on the positional information detected by the aforesaid positional information detecting means and a stored content in the aforesaid water area information storing means, and in that the aforesaid parameter selecting means selects a suitable control parameter for the sailing condition at the time from the aforesaid plurality of kinds of control parameters based on the information regarding the present sailing condition detected by the aforesaid sailing information detecting means and a determination result of the aforesaid designated water area determining means.

Namely, the water area information storing means in which the information of the designated water area is included, the designated water area determining means makes it possible to determine whether the aforesaid boat is located in the designated water area or not based on the positional information detected by the aforesaid positional information detecting means and the stored content of the aforesaid water area information storing means, the parameter selecting means is able to select the optimal control parameter as the control parameter inputted into the sailing control device from a plurality of kinds of control parameters based on the determination result and the information regarding the present sailing condition detected by the sailing information detecting means and input it into the sailing control device.

Accordingly, it is possible to select the control parameter based on the information of the designated water area, and therefore when the boat needs to sail in a dangerous water area such as a water area with a rock and a water area with an iceberg, for example, a suitable control parameter can be selected as the control parameter based on the information of them, thus making it possible to reduce a burden on the user in steering the boat.

The invention according to claim 3 is, in the control parameter selecting apparatus for the boat as set forth in claim 1 or claim 2, characterized by further comprising a calculating means of a distance the boat is capable of cruising, which calculates the distance the boat is capable of cruising based on a present fuel consumption amount and a present residual fuel amount, and cruising determining means for determining whether the aforesaid boat is capable of reaching a destination from a present position or not based on a calculation result of the calculating means of the distance the boat is capable of cruising and the positional information detected by the aforesaid positional information detecting means, and in that the aforesaid parameter selecting means selects a suitable control parameter for a sailing condition at the time from the aforesaid plurality of kinds of control parameters based on a determination result of the aforesaid cruising determining means.

Namely, by the calculating means of the distance the boat is capable of cruising, it is possible to calculate the distance the boat is capable of cruising based on the present fuel consumption amount and the residual fuel amount, by the cruising determining means, it is possible to determine whether the aforesaid boat is capable of reach the destination from the present position or not based on the calculation result of the calculating means of the distance the boat is capable of cruising, the positional information and the stored content of the aforesaid water area information storing means, and the parameter selecting means is able to select the suitable control parameter as the aforesaid control parameter based on the determination result of the aforesaid cruising determining means.

Accordingly, it becomes possible to perform a sailing control according to the suitable control parameter based on the determination result of the cruising determining means, and therefore the invention is useful in preventing the boat from coming into a standstill on the sea due to fuel shortage, for example.

The invention according to claim 4 is, in the control parameter selecting apparatus as set forth in claim 3, characterized in that the aforesaid parameter selecting means selects a control parameter according to which the aforesaid sailing control device controls the aforesaid boat to sail with low fuel consumption when the aforesaid cruising determining means determines that it is impossible to reach the aforesaid destination.

Namely, the parameter selecting means is able to select a suitable control parameter as the aforesaid control parameter so that the boat sails with a low fuel consumption when the cruising determining means determines that it is impossible to reach the destination.

Accordingly, the invention is useful in preventing the boat from coming into a standstill on the sea due to fuel shortage, for example.

The invention according to claim 5 is, in the control parameter selecting apparatus for the boat as set forth in claim 4, characterized in that the aforesaid parameter selecting means selects a suitable control parameter for the aforesaid boat to reach a nearest refueling location with the present residual fuel amount.

Namely, the parameter selecting means is able to select the optimal control parameter to reach the nearest refueling location with the residual fuel amount when the cruising determining means determines that it is impossible to reach the aforesaid destination.

Accordingly, the invention is useful in preventing the boat from coming into a standstill on the sea due to fuel shortage, for example.

The invention according to claim 6 is, in the control parameter selecting apparatus for the boat as set forth in any one of claim 3 to claim 5, characterized in that the aforesaid boat includes an outboard motor as the aforesaid propeller, and a power trim device capable of controlling a mounting angle of the outboard motor, and in that the aforesaid parameter selecting means selects a suitable control parameter as the control parameter which is inputted into the aforesaid power trim device in order to perform sailing with the aforesaid low fuel consumption.

Namely, the parameter selecting means adjusts the mounting angle of the outboard motor to the angle at which the fuel consumption is reduced by selecting the control parameter suitable for the sailing with low fuel consumption as the control parameter inputted into the power trim device included in the boat.

The invention according to claim 7 is, in the control parameter selecting apparatus for the boat as set forth in any one of claim 3 to claim 6, characterized by further comprising display means of a distance the boat is capable of cruising, which displays information of the distance the aforesaid boat is capable of cruising on a display part based on a calculation result of the aforesaid calculating means of the distance the boat is capable of cruising.

Namely, by the display means of the distance the boat is capable of cruising, it is possible to display the information of the distance the boat is capable of cruising on the display part.

Accordingly, by displaying the distance the boat is capable of cruising for the user to see it easily, it is possible to reduce a human error such as misconception of the cruising distance and the like.

The invention according to claim 8 is, in the control parameter selecting apparatus for the boat as set forth in any one of claim 1 to claim 7, characterized in that the aforesaid positional information detecting means is a GPS (Global Positioning System), or a DGPS (Differential GPS).

Namely, the positional information detecting means is the GPS, or the DGPS.

The invention according to claim 9 is, in the control parameter selecting apparatus according to any one of claim 1 to claim 8, characterized in that the aforesaid predetermined sailing control includes at least one of a speed control, an attitude control, a positional control and a steering control.

Namely, the predetermined sailing control includes at least one of the speed control, the attitude control, the positional control and the steering control.

A sailing control system according to claim 10 is characterized by comprising the control parameter selecting apparatus according to any one of claim 1 to claim 9, and a sailing control device for performing at least one of a speed control, an attitude control, a positional control and a steering control based on a control parameter selected by the control parameter selecting apparatus.

With the construction as above, it is possible to input a suitable control parameter for the sailing control device by the control parameter selecting apparatus, and the sailing control device is able to perform at least one of the speed control, the attitude control, the positional control and the steering control based on the inputted control parameter.

Accordingly, it becomes possible to perform each of the above-described control according to the suitable control parameter corresponding to the sailing condition of the boat, the water area where the boat is located, and the like.

DETAILED DESCRIPTION OF THE PREFERRED EMBODIMENTS

A preferred embodiment of the present invention will be explained based on the drawings. FIG. 1 to FIG. 7 are drawings showing an embodiment of a control parameter selecting apparatus according to the present invention.

Figure 1:
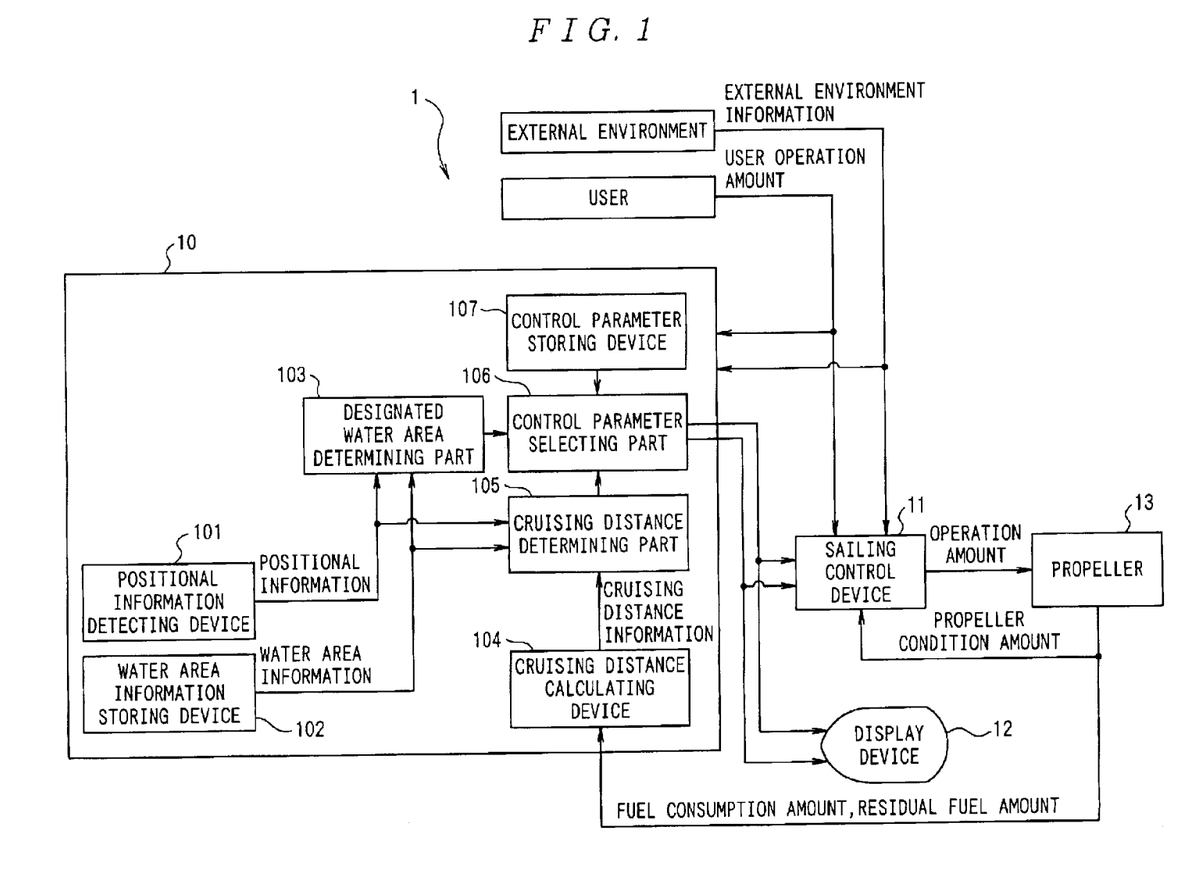
FIG. 1 is a block diagram showing a construction of a sailing control system 1 according to the present invention.

First, a construction of a sailing control system to which the control parameter selecting apparatus according to the present invention is applied will be explained based on FIG. 1. FIG. 1 is a block diagram showing a construction of the sailing control system according to the present invention.

As shown in FIG. 1, a sailing control system 1 has the construction including a control parameter selecting apparatus 10, a sailing control device 11, a display device 12 and a propeller 13.

The control parameter selecting apparatus 10 has a construction including a positional information detecting device 101 for detecting positional information of a boat, a water area information storing device 102 in which the information of a designated water area is stored, a designated water area determining part 103 for determining whether or not the boat is located in a designated water area based on the positional information of the boat detected by the positional information detecting device 101 and the stored content of the water area information storing device 102, a cruising distance calculating device 104 for calculating a distance the boat is capable of cruising based on a fuel consumption amount and a residual fuel amount, a cruising distance determining part 105 for determining whether cruising to the destination is possible or not based on the calculated distance the boat is capable of cruising, a control parameter selecting part 106 for selecting a control parameter for calculating a suitable control amount for a sailing condition at that time in the sailing control device 11 based on the determination result of the designated water area determining part 103, the determination result of the sailing distance determining part 105 and a stored content of a control parameter storing device 107 that will be described later, and a control parameter storing device 107 in which a plurality of kinds of control parameters are stored.

The sailing control device 11 performs predetermined sailing controls such as a speed control, an attitude control, a positional control and a steering control based on the control parameters inputted from the control parameter selecting apparatus 10.

The display device 12 displays the information relating to the control parameter of the control target in the sailing control device and the information relating to the distance the boat is capable of cruising on the display part.

The propeller 13 is sailing the boat by driving a propeller, jet pump and the like correspondingly to the control information from the sailing control device 11.

Figure 2:
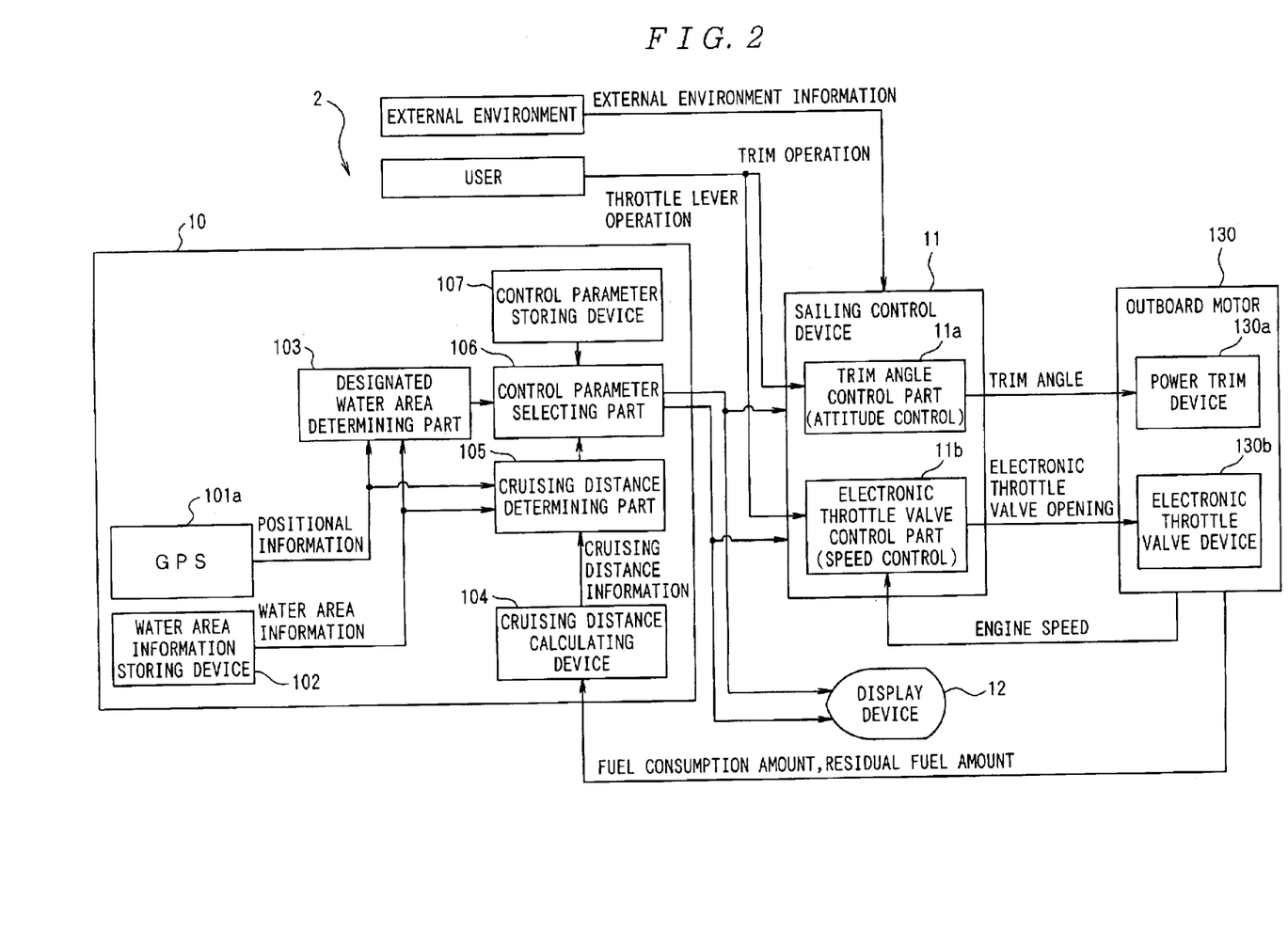
FIG. 2 is a block diagram showing a construction of a sailing control system 2 which is the result of making a sailing control system 1 have a more concrete construction.

A construction of a sailing control system 2 which is the result of making the construction of the sailing control system 1 more concrete will be explained based on FIG. 2. FIG. 2 is a block diagram showing the construction of the sailing control system 2 which is the result of making the construction of the sailing control system 1 more concrete.

As shown in FIG. 2, the sailing control system 2 has the construction including a control parameter selecting apparatus 10, a sailing control device 11, a display device 12 and an outboard motor 130.

The control parameter selection apparatus 10 has a construction including a GPS 101a as a positional information detecting device, the water area information storing device 102, the designated water area determining part 103, the calculating device 104 for a distance the boat is capable of cruising, the cruising distance determining part 105, the control parameter selecting part 106, and the control parameter storing device 107.

The GPS 101a receives information from a satellite and detects the positional information of a small boat, and is further capable of detecting ground speed of a small boat with use of the Doppler frequency from the satellite in this embodiment.

It should be noted that the water area information storing device 102, the designated water area determining part 103, the calculating device 104 for the distance the boat is capable of cruising, the cruising distance determining part 105, the control parameter selecting part 106 and the display device 12 are the same as those in the above-described sailing control system 1 and therefore the explanation of them will be omitted.

The sailing control device 11 has a construction including a trim angle control part 11a and an electronic throttle valve control part 11b.

The trim angle control part 11a controls a power trim device 130a that will be described later based on the control parameter inputted from the control parameter selecting part 106.

The electronic throttle valve control part 11b calculates a suitable electronic throttle valve opening based on the control parameter selected by the control parameter selecting part 106 and the target speed set by the user.

The outboard motor 130 has a construction including the power trim device 130a and an electronic throttle valve device 130b.

The power trim device 130a controls angles of inclination of the hull and the outboard motor correspondingly to a control signal from the trim angle control part 11a.

The electronic throttle valve device 130b is capable of performing open and close operation of the electronic throttle valve correspondingly to the control signal from the electronic throttle valve control part 11b and adjusting an intake air amount into an engine.

Here, in this embodiment, the control parameter selecting apparatus 10, the sailing control device 11, the display device 12 and the outboard motor 130 are connected by the LAN to be capable of data communication. Accordingly, the devices can transmit and receive data via a LAN cable between them.

In this embodiment, each of the control parameter selecting apparatus 10, the sailing control device 11 and the display device 12 has a CPU (Central Processing Unit), a ROM (Read Only Memory) in which a control program is stored and a RAM (Random Access Memory) for temporarily storing the data necessary to execute the program, and perform each processing by executing the control program by the CPU.

A more concrete operation of the sailing control system 2 will be explained. The sailing control system 2 obtains the positional information of the boat at fixed time intervals by the GPS 101a, and in the designated water area determining part 103, it performs processing of determining whether the boat is located in the designated water area or not based on the obtained positional information and the stored content in the water area information storing device 102. The determination result is inputted into the control parameter selecting part 106.

On the other hand, the cruising distance calculating device 104 obtains information of the present fuel consumption amount and the residual fuel amount from the outboard motor 130, performs calculation processing of the distance the boat is capable of cruising by the present fuel consumption amount based on the information of them, and inputs the calculation result into the cruising distance determining part 105. The cruising distance determining part 105 performs processing of determining whether the boat can reach the destination or not based on the calculated distance the boat is capable of cruising, the positional information from the GPS 101a and the stored content in the water area information storing device 102. The determination result is inputted into the control parameter selecting part 106.

The control parameter selecting part 106 determines whether the ship is capable of reaching the destination with the present fuel consumption amount and the residual fuel amount based on the determination result of the cruising distance determining part 105, and when it is capable of reaching the destination, it determines whether the boat is located in the designated water area or not based on the determination result of the designated water area determining part 103. If the boat is located in the designated water area, a suitable control parameter is read out of the control parameter storing device 107 based on the information of the designated water area and inputted into the sailing control device 11. If the boat is not located in the designated water area, the sailing control system 2 gives an instruction to the sailing control device 11 to perform a sailing control with priority being given to riding comfort according to the other inputted information obtained from the detecting device such as a speed detecting device not shown, which is capable of detecting the sailing condition of the boat.

When it is determined that the boat cannot reach the destination from the determination result of the cruising distance determining part 105, the control parameter to perform sailing of the boat with low fuel consumption is read out of the control parameter storing device 107 and is inputted into the sailing control device 11. Here, if it is determined that the boat is located in the designated water area from the determination result of the designated water area determining part 103, the control parameter suitable for the designated water area and for performing sailing with low fuel consumption is read out of the control parameter storing device 107 and inputted into the sailing control device 11.

Figure 3:
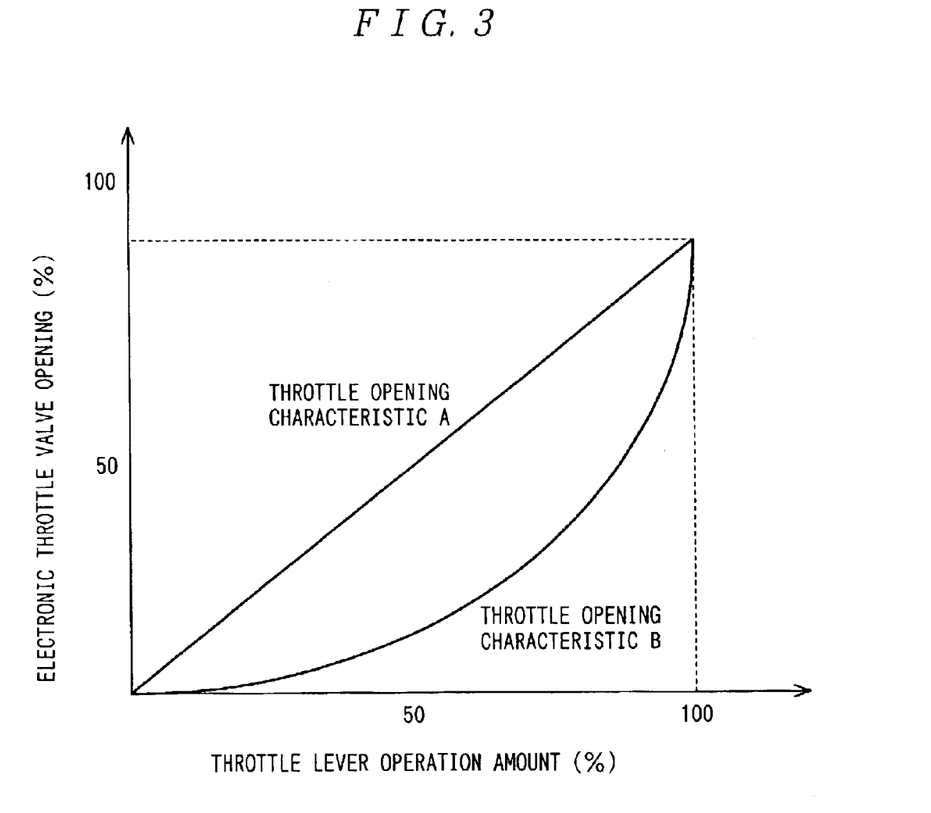
FIG. 3 is a diagram showing an example of a characteristic curve for throttle opening calculation.
Figure 4:
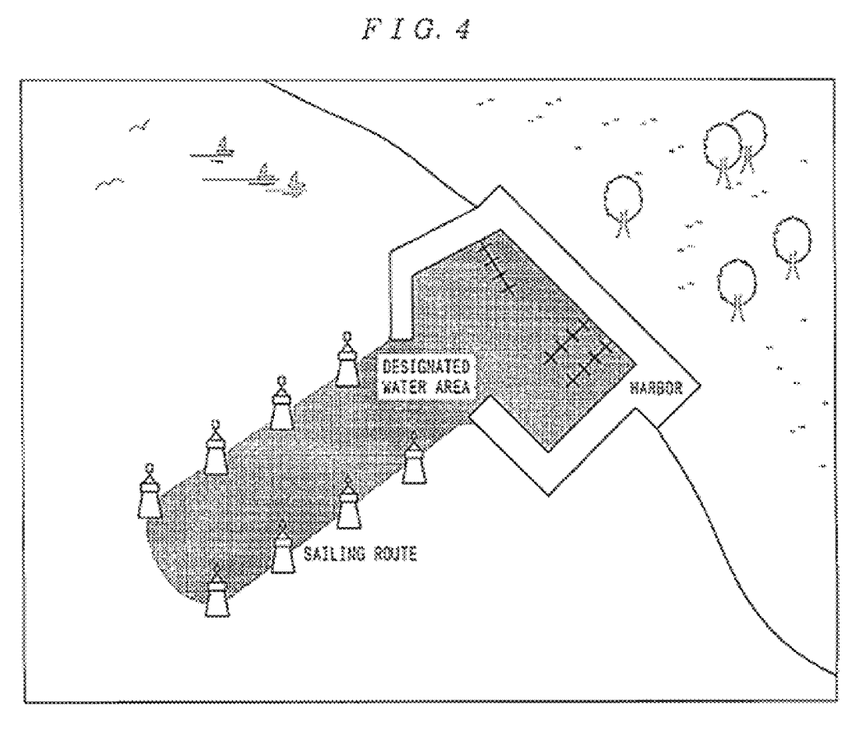
FIG. 4 is a diagram showing an example of a designated water area.

Here, as the control parameter which are selected in this embodiment, the control parameter for calculating the throttle valve opening according to the characteristic of a throttle opening characteristic B shown in FIG. 3 is selected from the control parameter storing device 107 in the throttle valve control part 11b so that the sailing speed becomes the suitable sailing speed in the designated water area, when the boat is capable of reaching the destination and is located in the designated water area having speed limit such as a slow down area in a harbor and an area in a sea route as shown in FIG. 4. When the boat is capable of reaching the destination and is located outside the designated water area, the control parameter for calculating the throttle valve opening according to the characteristic of the throttle opening characteristic A shown in FIG. 3 is selected from the control parameter storing device 107 in the throttle valve control part 11b. In this situation, in this embodiment, the control parameters are selected so that the trim angles of the outboard motor 130 becomes suitable trim angles to perform comfortable sailing for the users in both of the above-described cases.

When the boat is incapable of reaching the destination in the present sailing condition, and is located in the designated water area with speed limit such as a slow down area in the harbor and an area in the sea route as shown in FIG. 4, the control parameter for calculating the trim angle of the outboard motor 130 suitable for extending the distance the boat is capable of sailing and for sailing the boat slowly is selected from the control parameter storing device 107 in the trim angle control part 11a in addition to the control parameter for calculating the throttle valve opening according to the characteristic of the throttle opening characteristic B.

When the boat is incapable of reaching the destination and is located outside the designated water area, the control parameter for calculating the trim angle of the outboard motor 130 suitable for extending the distance the boat is capable of cruising is selected from the control parameter storing device 107 in the trim angle control part 11a, in addition to the control parameter for calculating the throttle valve opening according to the throttle opening characteristic with which the sailing speed of the boat is kept in the condition with good fuel economy.

Accordingly, the sailing control device 11 calculates the trim angle of the outboard motor 130 corresponding to the parameter in the trim angle control part 11*a* based on any of the above-described selected control parameters, and if there are any, the detection results from the other detecting devices or the like and inputs it into the power trim device 130*a* of the outboard motor 130 to control the trim angle, and calculates the electronic throttle valve opening corresponding to the parameter in the electronic throttle valve control part 11*b* and inputs it into the electronic throttle valve device 130*b* of the outboard motor 130 to control the speed of the boat.

Then, based on the control amount of the trim angle, which is inputted from the trim angle control part 11*a* in the sailing control device 11, the outboard motor 130 drives the power trim device 130*a* to adjust the mounting angle of the outboard motor 130 to the hull to be an angle corresponding to the control amount to change the boat into a desired attitude, and based on the control amount of the electronic throttle opening which is inputted from the electronic throttle valve control part 11*b*, the outboard motor 130 drives the electronic throttle valve device 130*b* to open and close the electronic throttle valve correspondingly to the control amount to obtain a desired intake air amount.

When the residual fuel amount becomes insufficient due to a sudden accident or by some mistake or the like in this embodiment, the control parameter is selected such that the boat sails to the nearest refueling location, in addition to the sailing control with low fuel consumption. This is realized by an auto pilot control part included in the sailing control device 11 and a power steering device included in the outboard motor 130, which are not illustrated.

Figure 5:
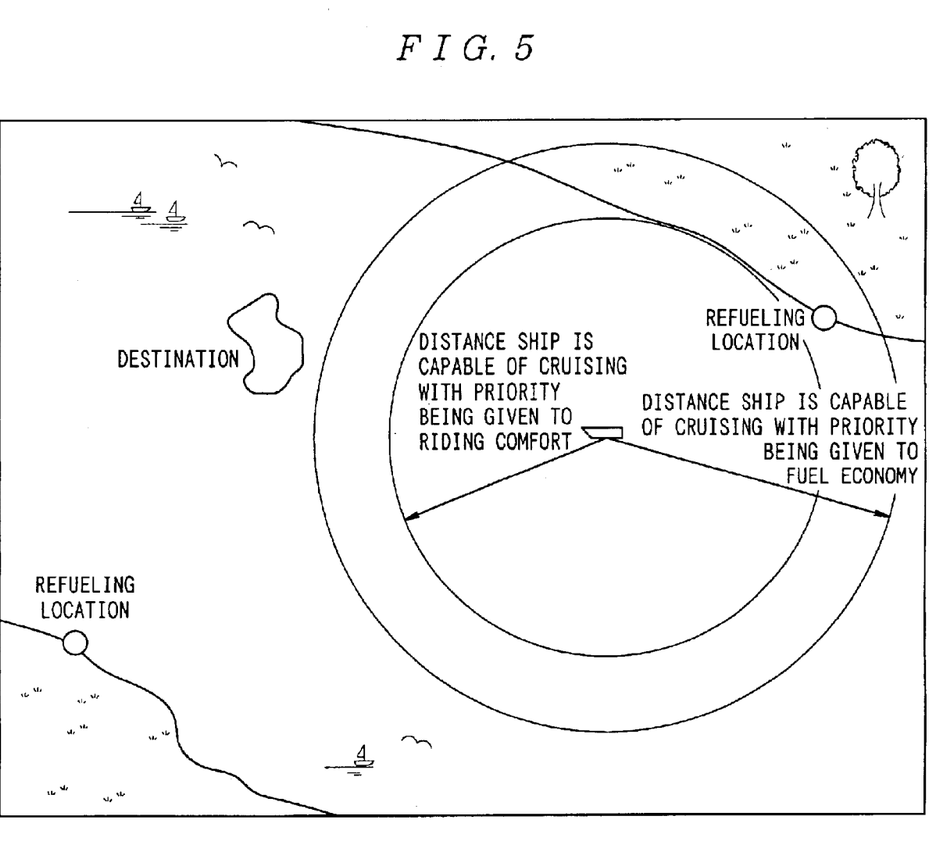
FIG. 5 is a diagram showing an example of the expression of the information of distances a boat is capable of cruising.

When the control parameter is selected, the information is inputted into the display device 12, whereby the graph and the like of the selected parameter characteristic is displayed on the display part. The display device 12 obtains the information regarding the distance the boat is capable of cruising from the control parameter selecting part 106, and thereby displays the information of the distance the boat is capable of cruising of the boat by the circles with the boat as a center as shown in FIG. 5. Here, the inner circle shown in FIG. 5 shows the distance the boat is capable of cruising when the sailing control with the priority being given to the riding comfort, and the outer circle shows the distance the boat is capable of cruising when the sailing control with the priority being given to the fuel consumption.

FIG. 5 shows an example in which the boat cannot reach the destination even if the sailing control with low fuel consumption, but can reach the nearest refueling location. In such a situation, the control parameter selecting part 106 selects the control parameter for each control part so that boat can reach the nearest refueling location with low fuel consumption as described above, and inputs it into the sailing control device 11.

Figure 6:
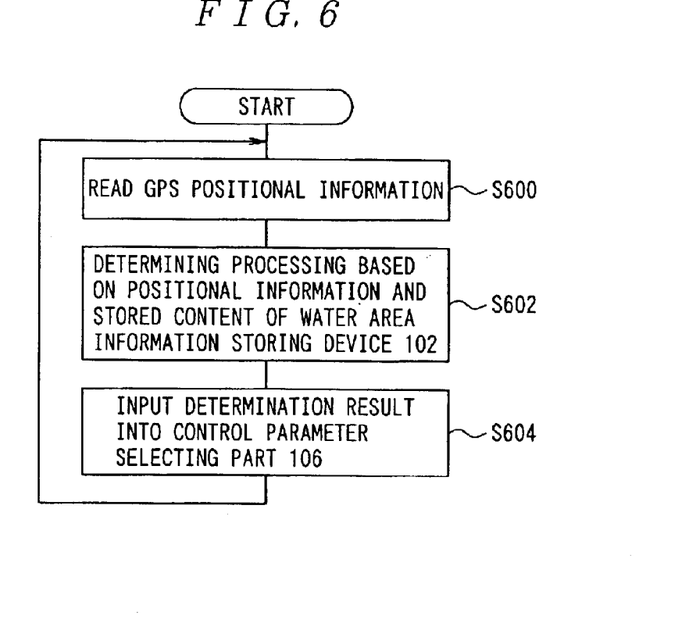
FIG. 6 is a flow chart showing a determining processing of a designated water area determining part 103 in a control parameter selecting apparatus 10.

Next, based on FIG. 6, a flow of the determination processing in the designated water area determining part 103 in the control parameter selecting apparatus 10 will be explained. FIG. 6 is a flow chart showing the determining processing of the designated water area determining part 103 in the control parameter selecting apparatus 10.

As shown in FIG. 6, a command is given to transfer to step S600 first, and the designated water area determining part 103 read the positional information detected by the GPS 101*a* and transfers to the step S602.

In step S602, in the designated water area determining part 13, it is determined whether the boat is located outside the designated water area or not based on the read positional information and the stored content in the water area information storing device 102 and a command is given to transfer to step S604.

In step S604, in the designated water area determining part 103, the determination result is inputted into the control parameter selecting part 106 and a command is given to step S600.

Figure 7:
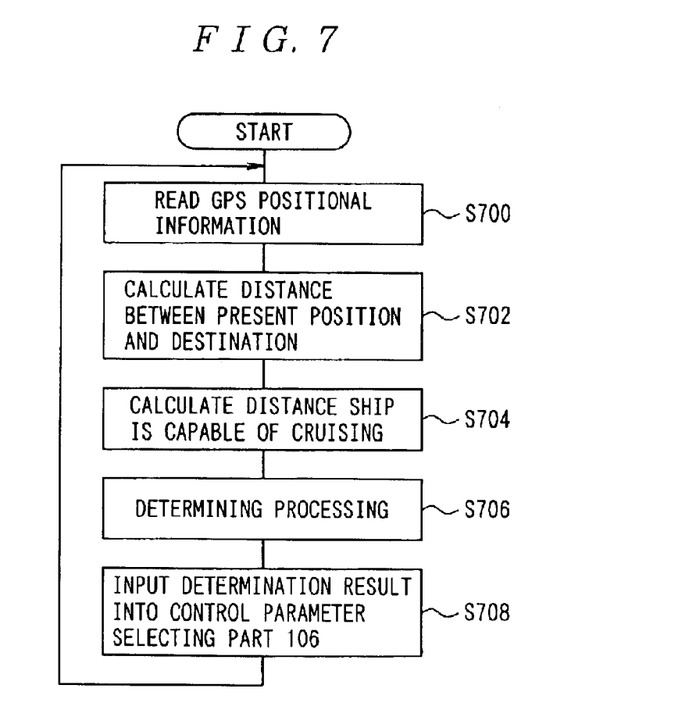
FIG. 7 is a flow chart showing a determining processing of a cruising distance by a cruising distance calculating device 104 and a cruising distance determining 105 in the control parameter selecting apparatus 10.

Based on FIG. 7, a flow of the determining processing of the cruising distance by the cruising distance calculating device 104 and the cruising distance determining part 105 in the control parameter selecting apparatus 10 will be explained. FIG. 7 is a flow chart showing the determining processing of the cruising distance by the cruising distance calculating device 104 and the cruising distance determining part 105 in the control parameter selecting apparatus 10.

As shown in FIG. 7, a command is given to transfer to step S700 first, and the cruising distance calculating device 104 reads the positional information detected by the GPS 101*a* and a command is given to transfer to step S702.

When the step is transferred to step S702, the cruising distance calculating device 104 calculates the distance between the present position and the designated position and a command is given to transfer to step S704.

In step S704, the cruising distance calculating device 104 calculates the distance the boat is capable of cruising from the distance between the present position and the designated position and the calculated result is inputted into the cruising distance determining part 105 and a command is given to transfer to step S706.

In step S708, it is determined whether sailing to the destination is possible or not based on the calculated distance the boat is capable of cruising and a command is given to transfer to step S710.

In step S710, the determination result is inputted into the control parameter selecting part 106, and a command is given to transfer to step S700.

Figure 8:
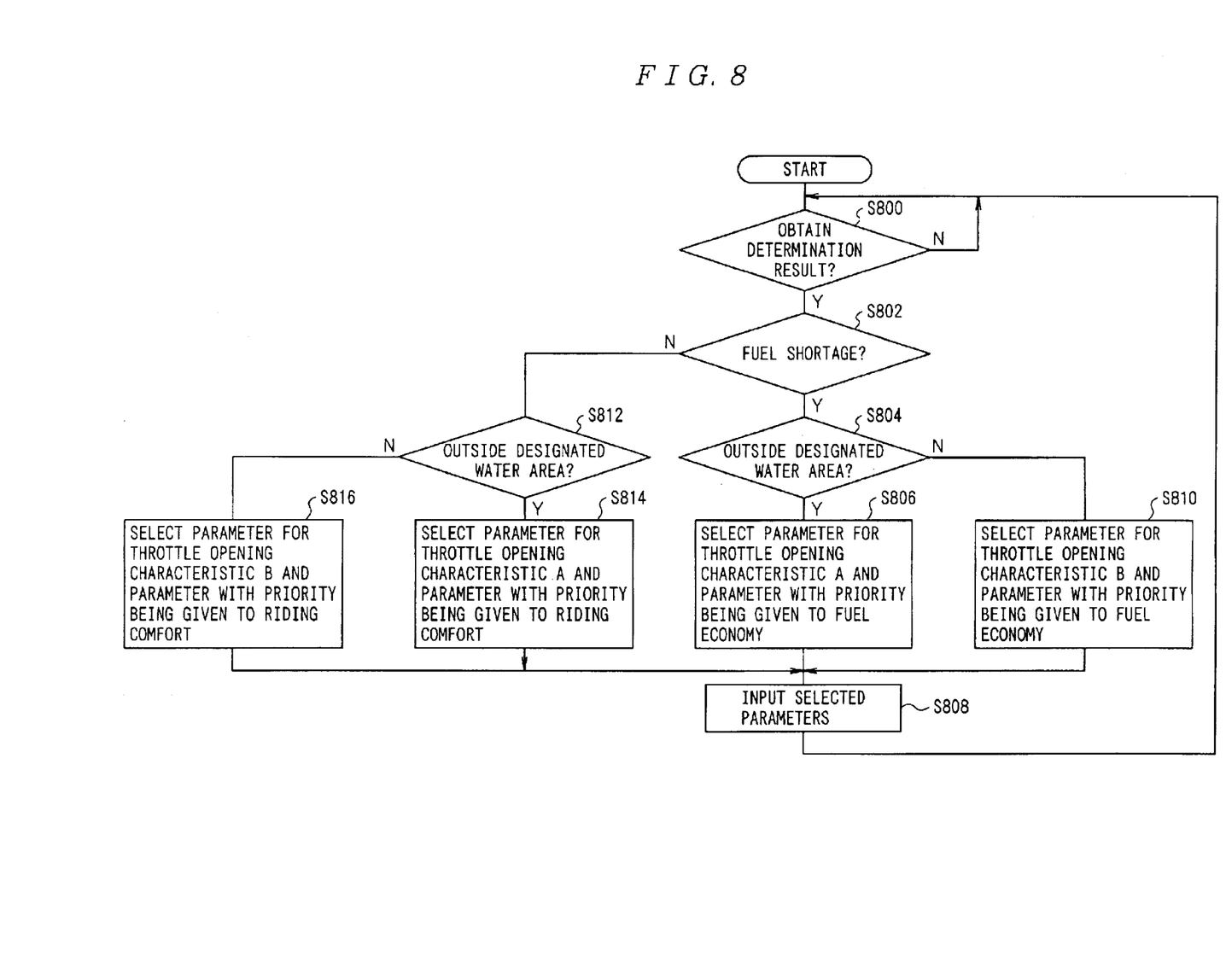
FIG. 8 is a flow chart showing a parameter selecting processing of a control parameter selecting part 106 in the control parameter selecting apparatus 10.

Based on FIG. 8, a flow of the parameter selecting processing of the control parameter selecting part 106 in the control parameter selecting apparatus 10 will be explained. FIG. 8 is a flow chart showing the parameter selecting processing of the control parameter selecting part 106 in the control parameter selecting apparatus 10.

As shown in FIG. 8, a command is given to transfer to step S800 first, and it is determined whether the determination results are obtained from the designated water area determining part 103 and the cruising distance determining part 105 or not. If it is determined that they are obtained (Yes), a command is given to transfer to step S802, and if it is not (No), a command is given to wait until they are obtained.

When the step is transferred to step S802, it is determined whether the fuel is insufficient or not based on the determination result of the cruising distance determining part 105. If it is determined that the fuel is insufficient (Yes), a command is given to transfer to step S804, and if it is not (No), a command is given to transfer to step S812.

When the step is transferred to step S804, it is determined whether the boat is located outside the designated water area or not based on the determination result of the designated water area determining part 103. If it is determined that it is located outside the designated water area (Yes), a command is given to step S806, and if it is not (No), a command is given to step S810.

When the step is transferred to step S806, the control parameter for the throttle opening characteristic A and the control parameter for giving priority to the fuel efficiency are read out of the control parameter storing device 107 and a command is given to transfer to step S808. Here, in this embodiment, as described above, when the boat cannot reach the destination even if the priority is given to the fuel efficiency, the parameter for controlling the power steering device is also selected so that the boat sails to the nearest refueling location. The information regarding the selected parameters are displayed on the display part by the display device 12.

In step S808, the selected control parameters are inputted into the sailing control device 11 and a command is given to transfer to step S800. Here, in this embodiment, it is possible to select whether the sailing control is set or not. If the sailing control is set, an automatic control by the sailing control device 111 is performed, and if the sailing control is not set, a user performs a manual operation.

On the other hand, when the boat is located inside the designated water area in step S804, and a command is given to transfer to step S810, the control parameter for the throttle opening characteristic B and the control parameter for giving priority to fuel efficiency are selected from the control parameter storing device 107 and read out, and a command is given to transfer to step S808.

When the fuel is not insufficient in step S802 and a command is given to transfer to step S812, it is determined whether the boat is located outside the designated water area or not based on the determination result of the designated water area determining part 103. If it is determined that the boat is located outside the designated water area (Yes), a command is given to step S814, and if it is not (No), a command is given to transfer to step S816.

When the step is transferred to the step S814, the control parameter for the throttle opening characteristic A and the control parameter for giving priority to the riding comfort are selected and read from the control parameter storing device 107 and a command is given to transfer to step S808.

On the other hand, when the step is transferred to the step S816, the control parameter for the throttle opening characteristic B and the control parameter for giving priority to the riding comfort are selected and read from the control parameter storing device 107 and a command is given to transfer to step S808.

Namely, the sailing control system 2 performs a sailing control of the boat based on the control parameters selected and inputted by the process of the step S800 to step S816.

It is possible to select the control parameters suitable for the sailing condition of the boat at each time based on the determination result inside and outside the designated water area and the determination result of the distance the boat is capable of cruising in the control parameter selecting apparatus 10, and input them into the sailing control device 11 to perform the sailing control, and therefore it is possible to reduce the burden on the user in steering the boat.

Here, the positional information detecting device 101 shown in FIG. 1, and the GPS 101a shown in FIG. 2 correspond to the positional information detecting means described in claims 1, 2, 3, and 8, the water area information storing device 102 corresponds to the water area information storing means described in claim 2, the cruising distance calculating device 104 corresponds to the calculating means of the distance the boat is capable of cruising described in claim 3 and claim 7, the display device 12 corresponds to the display means of the distance the boat is capable of cruising described in claim 7, the control parameter selecting part 106 corresponds to the parameter selecting means described in claim 1 to claim 6, the control parameter storing device 107 corresponds to the parameter storing means described in claim 1, the other detecting device in the specification corresponds to the sailing information detecting means described in claim 1 and claim 2.

In the above-described embodiment, the explanation is made with the controls of the power trim device, the electronic throttle valve device and the power steering device being cited as examples, but they are not restrictive, and the present invention may be applied to the control of the other device in the boat.

As explained thus far, according to the control parameter selecting apparatus according to the present invention, for example, in the designated water area where shallows, a rock and the like exist, the control parameters for performing a control to lower the upper limit of the engine speed and trim up, which correspond to the sailing condition of the boat, are selected, and therefore it is made possible to reduce the danger of occurrence of the accident such as stranding. In the water area away from the refueling location, the cruising distance is calculated from the fuel consumption amount and the residual fuel amount, and it is determined whether it is possible to reach the destination or not. When it is determined as impossible to reach the destination, the sailing control parameter to reduce the fuel consumption amount, which controls, for example, the trim angle of the outboard motor to switch the control content from precedence of riding comfort to precedence of fuel efficiency, is selected, and therefore it is possible to extend the distance the boat is capable of cruising and reduce the possibility of the boat being brought to a standstill on the sea. Accordingly, the sailing control system including the control parameter selecting apparatus according to the present invention makes it possible to carry out an optimal sailing control automatically in accordance with the sailing condition of the boat, and therefore reduces the burden on the user.

What is claimed is:

1. A control parameter selecting apparatus for a boat, in a boat comprising a propeller and a sailing control device which performs a predetermined sailing control based on a control parameter, said control parameter selecting apparatus comprising:

parameter storing means for storing a plurality of kinds of said control parameters corresponding to various sailing conditions;

sailing information detecting means for detecting information regarding the sailing condition of said boat;

positional information detecting means for detecting positional information of the boat;

parameter selecting means for selecting a suitable control parameter at the time from said plurality of kinds of control parameters based on the information regarding said sailing condition detected by said sailing information detecting means and the positional information of said boat detected by said positional information detecting means, and inputting it into said sailing control device;

a calculating means of a distance the boat is capable of cruising, which calculates the distance the boat is capable of cruising based on a present fuel consumption amount and a present residual fuel amount; and cruising determining means for determining whether said boat is capable of reaching a destination from a present position or not based on a calculation result of the calculating means of the distance the boat is capable of cruising and the positional information detected by said positional information detecting means, wherein said parameter selecting means selects a suitable control parameter for a sailing condition at the time from said plurality of kinds of control parameters based on a determination result of said cruising determining means.

2. A control parameter selecting apparatus for a boat, in a boat comprising a propeller and a sailing control device which performs a predetermined sailing control based on a control parameter, said control parameter selecting apparatus comprising:

parameter storing means for storing a plurality of kinds of said control parameters corresponding to various sailing conditions;

sailing information detecting means for detecting information regarding the sailing condition of said boat;

positional information detecting means for detecting positional information of the boat;

parameter selecting means for selecting a suitable control parameter at the time from said plurality of kinds of control parameters based on the information regarding said sailing condition detected by said sailing information detecting means and the positional information of said boat detected by said positional information detecting means, and inputting it into said sailing control device;

water area information storing means for storing information of a designated water area;

designated water area determining means for determining whether said boat is located in the designated water area or not based on the positional information detected by said positional information detecting means and a stored content in said water area information storing means, a calculating means of a distance the boat is capable of cruising, which calculates the distance the boat is capable of cruising based on a present fuel consumption amount and a present residual fuel amount;

cruising determining means for determining whether said boat is capable of reaching a destination from a present position or not based on a calculation result of the calculating means of the distance the boat is capable of cruising and the positional information detected by said positional information detecting means, wherein said parameter selecting means selects a suitable control parameter for a sailing condition at the time from said plurality of kinds of control parameters based on the information regarding the present sailing condition detected by said sailing information detecting means, determination result of said designated water area determining means, and a determination result of said cruising determining means.

3. The control parameter selecting apparatus according to claim 1,
wherein said parameter selecting means selects a control parameter at which said sailing control device controls said boat to sail with a low fuel consumption when said cruising determining means determines that it is impossible to reach said destination.

4. The control parameter selecting apparatus for the boat according to claim 1,
wherein said parameter selecting means selects a suitable control parameter for said boat to reach a nearest refueling location with the present residual fuel amount.

5. The control parameter selecting apparatus for the boat according to claim 1,
wherein said boat includes an outboard motor as said propeller, and a power trim device capable of controlling a mounting angle of the outboard motor, and
wherein said parameter selecting means selects a suitable control parameter as the control parameter which is inputted into said power trim device in order to perform sailing with said low fuel consumption.

6. The control parameter selecting apparatus for the boat according to claim 1, further comprising:
display means of a distance the boat is capable of cruising, which displaying information of the distance said boat is capable of cruising on a display part based on a calculation result of said calculating means of the distance the boat is capable of cruising.

7. The control parameter selecting apparatus for the boat according to claim 1,
wherein said positional information detecting means is GPS (Global Positioning System), or DGPS (Differential GPS).

8. The control parameter selecting apparatus according to claim 1,
wherein said predetermined sailing control includes at least one of a speed control, an attitude control, a positional control and a steering control.

9. A sailing control system, comprising:
the control parameter selecting apparatus according to claim 1; and
a sailing control device for performing at least one of a speed control, an attitude control, a positional control and a steering control based on a control parameter selected by the control parameter selecting apparatus.

10. The control parameter selecting apparatus according to claim 2,
wherein said parameter selecting means selects a control parameter at which said sailing control device controls said boat to sail with a low fuel consumption when said cruising determining means determines that it is impossible to reach said destination.

11. The control parameter selecting apparatus for the boat according to claim 2,
wherein said parameter selecting means selects a suitable control parameter for said boat to reach a nearest refueling location with the present residual fuel amount.

12. The control parameter selecting apparatus for the boat according to claim 2,
wherein said boat includes an outboard motor as said propeller, and a power trim device capable of controlling a mounting angle of the outboard motor, and
wherein said parameter selecting means selects a suitable control parameter as the control parameter which is inputted into said power trim device in order to perform sailing with said low fuel consumption.

13. The control parameter selecting apparatus for the boat according to claim 2, further comprising:
display means of a distance the boat is capable of cruising, which displaying information of the distance said boat is capable of cruising on a display part based on a calculation result of said calculating means of the distance the boat is capable of cruising.

14. The control parameter selecting apparatus for the boat according to claim 2,
   wherein said positional information detecting means is GPS (Global Positioning System), or DGPS (Differential GPS).

15. The control parameter selecting apparatus according to claim 2,
   wherein said predetermined sailing control includes at least one of a speed control, an attitude control, a positional control and a steering control.

16. A sailing control system, comprising:
   the control parameter selecting apparatus according to claim 2; and
   a sailing control device for performing at least one of a speed control, an attitude control, a positional control and a steering control based on a control parameter selected by the control parameter selecting apparatus.

* * * * *